April 14, 1931.  W. V. WYNNE  1,801,064
LOOM PICKER
Filed Dec. 10, 1929
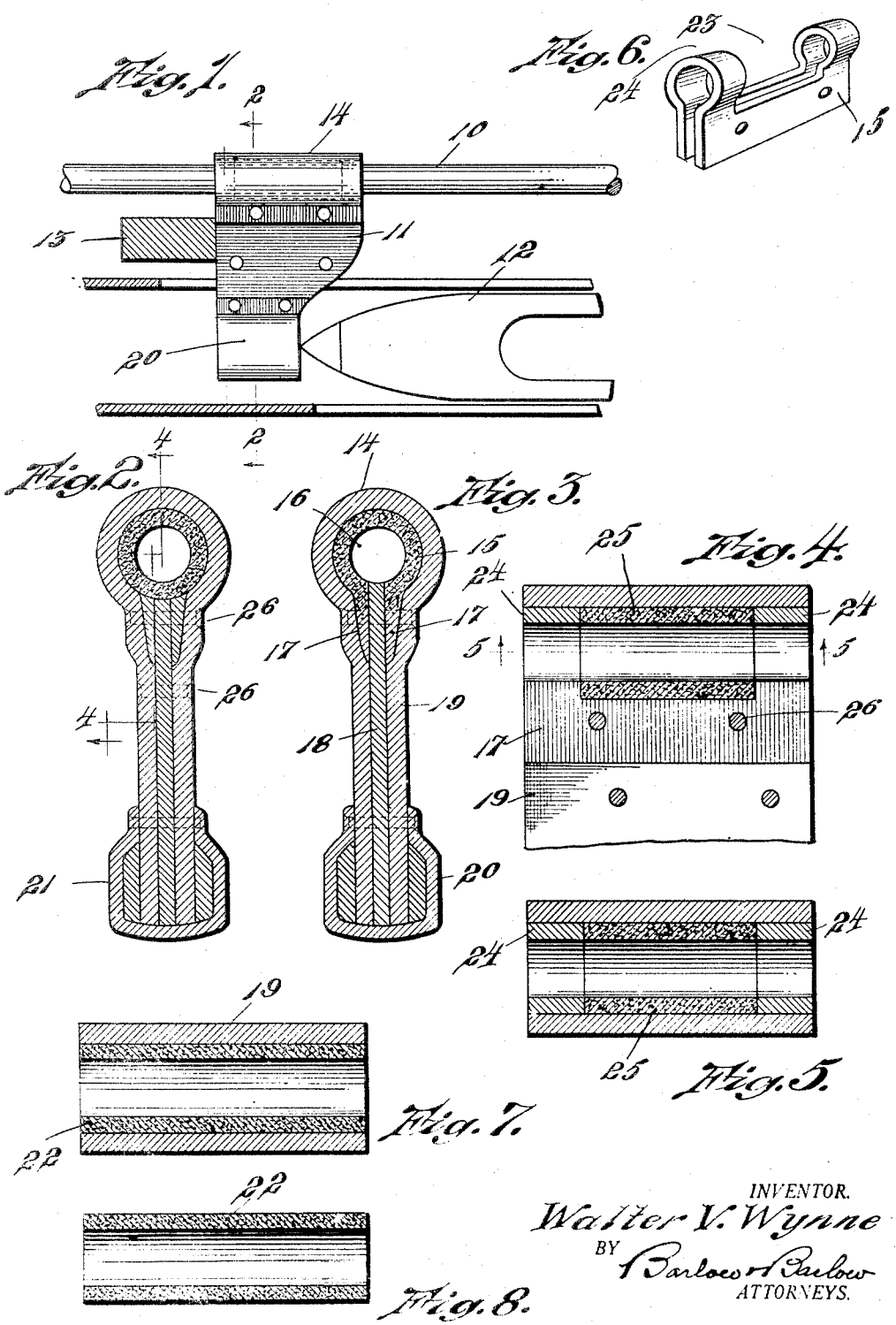
INVENTOR.
Walter V. Wynne
BY Barlow & Barlow
ATTORNEYS.

Patented Apr. 14, 1931

1,801,064

UNITED STATES PATENT OFFICE

WALTER V. WYNNE, OF LINCOLN, RHODE ISLAND, ASSIGNOR TO HOLBROOK RAW-HIDE COMPANY, OF PROVIDENCE, RHODE ISLAND, A CORPORATION OF RHODE ISLAND

LOOM PICKER

Application filed December 10, 1929. Serial No. 413,018.

This invention relates to an improved picker for power looms; and has for its object to diminish the friction of the sliding action of the picker on its bearing rod.

A further object of the invention is to form the bearing loop of the picker or a portion thereof of material which has been treated in such a way as to lubricate the bearing rod along which the picker slides.

A still further object of the invention is to form the bearing loop of the picker or a portion thereof of a material which has been treated in such a way as to relinquish lubricant embodied therein in proportion to the amount of heat generated by the sliding of the picker on its bearing rod.

A further object is to form a sleeve member impregnated with antifriction material and of a length less than that of the rod bearing loop of the picker and form this sleeve in the bearing portion of the picker.

The invention further consists in the forming of a picker with a body portion and a rod bearing loop portion, both of a plurality of superimposed layers of rawhide or other suitable material, the inner bearing layer about the loop being recessed intermediate its ends into which recess is set an antifriction bearing sleeve, the same being secured in the loop and to the body portion of the picker by an outer layer of rawhide or other material.

With these and other objects and advantageous features in view, the invention consists of certain novel features of construction, as will be more fully described, and particularly pointed out in the appended claims.

In the drawings:—

Fig. 1 is a top view showing my improved picker as mounted on a picker rod, and in position to engage the shuttle;

Fig. 2 is a section on line 2—2 of Figure 1 through the picker;

Fig. 3 is a similar section showing a modified construction without the sleeve and showing the material itself impregnated;

Fig. 4 is a central section on line 4—4 of Figure 2;

Fig. 5 is a section on line 5—5 of Figure 4;

Fig. 6 is a perspective view showing the inner layer of rawhide about the bearing loop as recessed to receive the antifriction sleeve;

Fig. 7 is a modification showing the antifriction sleeve as extending the entire length of the picker rod bearing;

Fig. 8 is a detail of the antifriction sleeve, in section.

It is found in the practical construction and operation of pickers for power driven looms that owing to the fact, the picker travels at a high rate of speed on the picker rod, that the rod in the absence of proper lubrication often becomes heated and binds in the picker bearing, and as it is found objectionable and impracticable to apply oil to this rod, I have devised a new construction of antifriction bearing for the bearing portion of the picker which overcomes this difficulty.

These pickers are usually constructed in a laminated arrangement of a plurality of layers of rawhide or fibrous or other suitable material which is found in practice to form a picker which is strong and durable for the purpose of resisting the constant shocks, jars and wear to which the usual picker is subjected, and I have impregnated the layer of rawhide or other material which contacts with the bearing rod with a material which will lubricate the same, or a sleeve may be inserted in which case, as this rawhide is of a tougher and better shock resisting material than that from which the antifriction sleeve is usually constructed, it is found of advantage to so position the sleeve that it will not project through the entire bearing, but that its ends will be protected by the rawhide. To accomplish these results, I have recessed the inner layer of rawhide which assists in forming the loop and have inserted therein a sleeve of antifriction material and over and about the whole I apply and secure an outer layer of rawhide or other material, which is of a length to also cover the body portion of the picker; and the following is a detailed description of the present embodiment of my invention and showing the preferred means by which these advantageous results may be accomplished:

With reference to the drawings, 10 designates the picker rod on which the picker 11 slides being driven to force the shuttle across the loom by the picker stick 13. The picker is usually laminated, being constructed of a number of superimposed layers of suitable material such as rawhide; the rod bearing loop portion 14 of the picker being formed with an inner layer 15 of rawhide, which extends around the bearing opening 16 and has end portions 17 arranged to embrace the center strip 18, which center strip and the inner layer 15 are both covered by an outer layer 19 of rawhide; the end portion 20 of the picker which engages the shuttle being built up or enlarged as illustrated at 21.

It is found in practice that the reciprocating sliding motion of the picker on the picker rod in the absence of lubrication often causes the rod to become heated, which naturally increases the sliding friction of the picker thereon, and therefore it is found of advantage to supply some sort of lubrication to the rod; and one simple and practical way of accomplishing this result is to impregnate the material 15 with a lubricant, as shown in Figure 3, which will be liberated by the heat caused by friction of the bearing on the rod, or I may provide an antifriction sleeve or lining 22 which may be constructed of any suitable material, such as wood, fibre, fabric, or other suitable material and impregnate this material with a suitable lubricant, and I have prepared, inserted and secured such an antifriction bearing sleeve in the bearing loop of the picker, whereby the rod is continually lubricated and the sliding friction of the picker on the rod is reduced to the minimum. By the use of my improved lubricant containing bearing material, the same becomes more active when it is most needed, which is at the time when the rod becomes slightly heated from the sliding friction of the picker thereon, the heat serving to soften, liquify or release the lubricant, thus reducing the sliding friction to the minimum.

As it is found in most instances of advantage to protect the ends of this antifriction sleeve from being disintegrated or otherwise detrimentally affected by the pounding action at the ends of the loop portion of the picker, I have recessed or cut away as at 23 the inner layer of rawhide about the loop, as best illustrated in Figure 6, leaving the end portions 24 thereon, and have inserted a length of this antifriction sleeve 25 as best illustrated in Figures 4 and 5, intermediate the end portions 24 of the sleeve, by which construction I protect this antifriction sleeve from the pounding action at the ends of the bearing of the picker and so extend the wearing life of this inserted more fragile sleeve.

By this construction it will be seen that the antifriction sleeve is locked firmly in position in the bearing loop portion of the picker by the folding of the outer layer 19 of rawhide about this loop, which outer layer is secured in position to the body portion by suitable rivets 26.

In some instances, instead of recessing the inner layer 15 and inserting a short antifriction sleeve therein, I may insert an antifriction sleeve of the full length of the bearing, as illustrated at 22 in Figures 7 and 8.

My improved means of lubricating the picker rod is very simple and practical in construction and is effective in its operation, and by its use the length of the wearing life of the picker is materially increased, and none of the lubricant can soil the cloth.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:—

1. A picker comprising a body portion and an elongated picker rod bearing loop formed of a plurality of superimposed layers of material, the inner layer of said loop being recessed for a portion of its length intermediate its ends, and a bearing sleeve in said recessed portion of a material impregnated with an antifriction material.

2. A picker comprising a body portion and an elongated picker rod bearing loop formed of a plurality of superimposed layers of rawhide material, the inner layer of said loop being recessed for a portion of its length intermediate its ends and a bearing sleeve in said recessed portion of wood impregnated with antifriction material.

In testimony whereof I affix my signature.

WALTER V. WYNNE.